(12) United States Patent
Daley et al.

(10) Patent No.: US 9,935,949 B2
(45) Date of Patent: *Apr. 3, 2018

(54) SYSTEMS AND METHODS FOR MUTUAL AUTHENTICATION OF ELECTRONIC DEVICES

(71) Applicant: GOOGLE LLC, Mountain View, CA (US)

(72) Inventors: Michael Daley, Mountain View, CA (US); Peiter Zatko, Mountain View, CA (US); Deepak Chandra, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/628,253

(22) Filed: Jun. 20, 2017

(65) Prior Publication Data

US 2017/0289149 A1 Oct. 5, 2017

Related U.S. Application Data

(60) Continuation of application No. 15/387,357, filed on Dec. 21, 2016, now Pat. No. 9,716,715, which is a
(Continued)

(51) Int. Cl.
*H04L 29/06* (2006.01)
*G06F 21/44* (2013.01)
(Continued)

(52) U.S. Cl.
CPC ........ *H04L 63/0869* (2013.01); *G06F 21/445* (2013.01); *H04L 9/3273* (2013.01); *H04W 12/06* (2013.01); *H04L 2463/121* (2013.01)

(58) Field of Classification Search
CPC ....... G06F 21/31; H04L 63/083; H04L 63/08; H04L 63/102; H04L 63/0815
(Continued)

(56) References Cited

U.S. PATENT DOCUMENTS 9,565,187 B2 2/2017 Daley et al.
9,716,715 B2 * 7/2017 Daley .................. G06F 21/445
(Continued)

FOREIGN PATENT DOCUMENTS

WO WO-2009/066212 A1 5/2009

OTHER PUBLICATIONS

International Search Report and Written Opinion for Application No. PCT/US2016/013861, dated Mar. 16, 2016.
(Continued)

*Primary Examiner* — Baotran N To
(74) *Attorney, Agent, or Firm* — Marshall, Gerstein & Borun LLP (57) ABSTRACT

Embodiments are provided for mutually authenticating a pair of electronic devices. According to certain aspects, the electronic devices may connect to each other via an out-of-band communication channel. The electronic devices may each output audio signals and detect audio signals output by the other electronic devices. Based on timestamps associated with audio output and detection events, each of the electronic devices may calculate relevant time and distance parameters, and transmit the calculated parameters to the other electronic device via the out-of-band communication channel. The electronic devices may compare the calculated parameters to determine mutual authentication.

20 Claims, 5 Drawing Sheets

Related U.S. Application Data division of application No. 14/615,234, filed on Feb. 5, 2015, now Pat. No. 9,565,187.

(51) Int. Cl.
*H04L 9/32* (2006.01)
*H04W 12/06* (2009.01)

(58) Field of Classification Search
USPC .......................................................... 726/6
See application file for complete search history.

(56) References Cited

U.S. PATENT DOCUMENTS

| | | |
|---|---|---|
| 2004/0203600 A1 | 10/2004 | McCorkle et al. |
| 2008/0304361 A1 | 12/2008 | Peng et al. |
| 2014/0064034 A1 | 3/2014 | Zhang et al. |
| 2014/0129231 A1 | 5/2014 | Herring et al. |

OTHER PUBLICATIONS

Peng et al., "BeepBeep: A High Accuracy Acoustic Ranging System using COTS Mobile Devices," Proceedings of the 5th International Conference on Embedded Networked Sensor Systems (2007).

\* cited by examiner

SYSTEMS AND METHODS FOR MUTUAL AUTHENTICATION OF ELECTRONIC DEVICES

CROSS-REFERENCE TO RELATED APPLICATIONS

This application is a continuation of U.S. patent application Ser. No. 15/387,357, now U.S. Pat. No. 9,716,715, filed Dec. 21, 2016, which is a divisional of U.S. patent application Ser. No. 14/615,234, now U.S. Pat. No. 9,565,187, filed Feb. 5, 2015. These applications are incorporated herein by reference in their entireties.

FIELD

This application generally relates to mutual authentication. In particular, the application relates to platforms and techniques for mutually authenticating a set of electronic devices via communication over an out-of-band channel.

BACKGROUND

Mutual authentication is a technique employed by two devices that concurrently authenticate each other such that each device may be assured of the other device's identity. In some cases, a client device and a server may mutually authenticate; in other cases, two client devices may mutually authenticate with each other. Mutual authentication offers an added layer of security for the devices. Accordingly, threats posed to the devices such as phishing, malware, and other common attacks may be reduced or eliminated.

There are various existing techniques for mutual authentication. Generally, for a successful mutual authentication, each device must successfully respond to a challenge from the other device. Some mutual authentication techniques incorporate pairs of public and private keys. Some other techniques involve the devices sensing each other, such as via the output and detection of audio. However, current mutual authentication techniques that incorporate audio lack an added layer of security that is afforded to more digital data-based mutual authentication techniques.

Accordingly, there is an opportunity for audio-based mutual authentication techniques having an added layer of security.

SUMMARY

In one aspect, a method in a first electronic device of mutual authentication between the first electronic device and a second electronic device is provided. The method includes connecting to the second electronic device via a communication channel, outputting, via a speaker of the first electronic device, a first audio signal detectable by the second electronic device, and receiving, from the second electronic device via the communication channel, a first estimated distance between the first electronic device and the second electronic device, the first estimated distance calculated by the second electronic device based on the first audio signal. The method further includes receiving, via a microphone of the first electronic device, a second audio signal output by the second electronic device, calculating, based on the second audio signal, a second estimated distance between the first electronic device and the second electronic device, and determining that a difference between the first estimated distance and the second estimated distance is below a threshold amount.

In another aspect, an electronic device configured to mutually authenticate to an additional electronic device is disclosed. The electronic device includes a communication module configured to connect the electronic device to the additional electronic device via a communication channel, a speaker configured to output audio, a microphone configured to detect audio, and a processor adapted to interface with the communication module, the speaker, and the microphone. The processor is configured to cause the speaker to output a first audio signal detectable by the additional electronic device, and receive, from the additional electronic device via the communication channel, a first estimated distance between the electronic device and the additional electronic device, the first estimated distance calculated by the additional electronic device based on the first audio signal, The processor is further configured to receive, via the microphone, a second audio signal output by the additional electronic device, calculate, based on the second audio signal, a second estimated distance between the electronic device and the additional electronic device, and determine that a difference between the first estimated distance and the second estimated distance is below a threshold amount.

In a further aspect, an electronic device configured to mutually authenticate to an additional electronic device is disclosed. The electronic device includes a communication module configured to connect the electronic device to the additional electronic device via a communication channel, a speaker configured to output audio, a microphone configured to detect audio, and a processor adapted to interface with the communication module, the speaker, and the microphone. The processor is configured to detect a playback command, cause the speaker to output a first audio signal detectable by the additional electronic device, wherein the microphone also detects the first audio signal output by the speaker, record a first audio received timestamp corresponding to when the processor receives the first audio signal from the microphone, and receive, from the microphone, a second audio signal detected by the microphone and output by the additional electronic device. The processor is further configured to record a second audio received timestamp corresponding to when the processor receives the second audio signal, receive, from the additional electronic device via the communication channel, a turnaround time based on when the additional electronic device detects the first audio signal and outputs the second audio signal, and calculating a round-trip audio flight time based on the first audio received timestamp, the second audio received timestamp, a local flight time constant value, and the turnaround time.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Mutual authentication is a technique employed by two devices that concurrently authenticate each other such that each device may be assured of the other device's identity. Mutual authentication of a pair of electronic devices offers an added layer of security for the devices. As a result, threats posed to the devices such as phishing, malware, and other common attacks may be reduced or eliminated.

The present embodiments provide for systems and methods for mutual authentication by a pair of electronic devices. According to aspects, the pair of electronic devices may be physically proximate to each other and may connect to each other via an out-of-band channel, such as a wireless local area network (WLAN) or other type of communication network. The electronic devices may exchange playback commands and/or timing data via the out-of-band channel. Each electronic device may output an audio signal that is detectable by the other electronic device. Based on the playback commands, the timing data, and/or the audio detection, each electronic device may calculate various timing metrics and exchange, via the out-of-band channel, the timing metrics with the other electronic device. Based on the timing metrics, each electronic device may estimate the distance between the electronic devices and, if the estimated distances are the same or similar, then the electronic devices may deem each other mutually authenticated.

Figure 1:
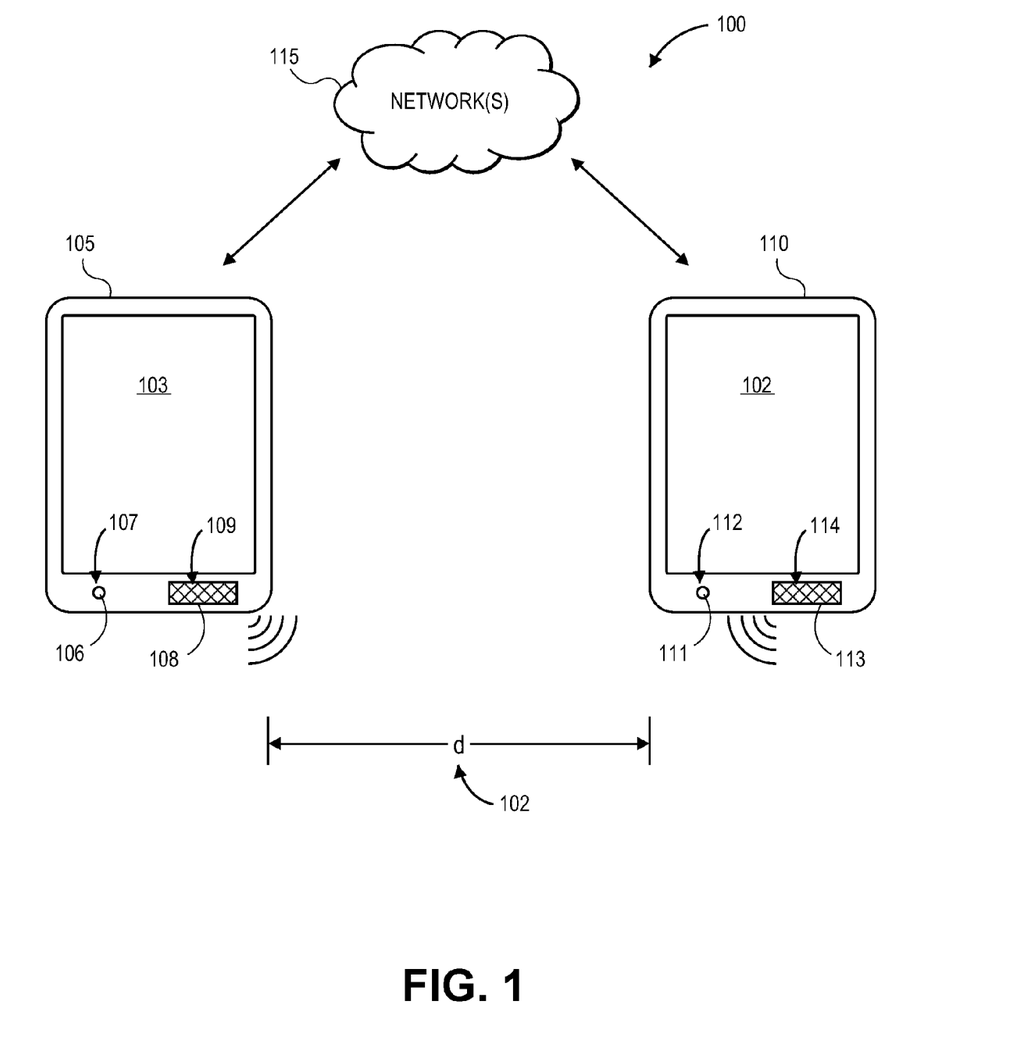
FIG. 1 depicts an example representation of multiple electronic devices capable of communicating with each other and facilitating various mutual authentication techniques, accordance with some embodiments.

FIG. 1 depicts an environment 100 in which a pair of electronic devices may mutually authenticate to each other. The environment 100 includes a first electronic device 105 and a second electronic device 110. Each of the electronic devices 105, 110 may be any type of electronic device, for example, a desktop computer, a notebook computer, a mobile phone, a Personal Digital Assistant (PDA), a smart phone, a tablet computer, a multimedia player, an MP3 player, a digital broadcast receiver, a remote controller, a digital camera, a digital video recorder, or any other electronic apparatus. Regardless of the type of electronic device, it should be appreciated that each of the electronic devices 105, 110 may be equipped with at least an audio output component, an audio input component, a communication component, and a processing component.

The electronic devices 105, 110 can each include audio components configured to output audio or detect audio. In particular, the first electronic device 105 can include a speaker 109 with a grille 108, and a microphone 107 with an aperture 106. Similarly, the second electronic device 110 can include a speaker 114 with a grille 113, and a microphone 112 with an aperture 111. Each of the speakers 109, 114 is configured to output audio based on an electrical audio signal and each of the microphones 107, 112 is configured to convert detected sound into an electrical signal. It should be appreciated that the multiples, types, sizes, and locations of the speakers 109, 114, the speaker grilles 108, 113, the microphones 107, 112, and the microphone apertures 106, 111 are merely examples and that other multiples, types, sizes, and locations are envisioned.

As illustrated in FIG. 1, each of the electronic devices 105, 110 may also include a visual component 103, 102 (e.g., a touchscreen or an electronic display) that is configured to display content. Each of the electronic devices 105, 110 may also include one or more touch input components, such as a capacitive touch sensor integrated into a touchscreen or separate mechanical buttons, to receive or detect input from a respective user of the electronic device 105, 110.

The first electronic device 105 is configured to communicate with (or simply, connect to) the second electronic device 110, and vice-versa, via a communication network 115. Generally, the communication or connection via the communication network 115 may be deemed "out of band," as it is separate from the audio input and audio output functionalities facilitated by the audio components of the electronic devices 105, 110. The communication network 115 may be any type of WLAN or wireless personal area network (WPAN) functioning in accordance with any IEEE 802 standard or other standard. The communication network 115 may further support various short-range communication protocols such as Bluetooth®, Bluetooth® Low Energy, near field communication (NFC), radio-frequency identification (RFID), and/or other types of short-range protocols.

To facilitate the mutual authentication, each of the electronic devices 105, 110 may connect to the communication network 115 (i.e., connect to each other via the communication network 115). In operation, the electronic device 105 outputs, via the speaker 109, a first audio signal (e.g., a tone, sound, audio file, etc.) in response to an audio playback command or request. In addition to the microphone 107 of the electronic device 105 detecting the first audio signal output, the microphone 112 of the electronic device 110 detects the first audio signal output.

Similarly, at a separate time, the electronic device 110 outputs, via the speaker 114, a second audio signal (e.g., a tone, sound, audio file, etc.) in response to an additional audio playback command or request. In addition to the microphone 112 of the electronic device 110 detecting the second audio signal output, the microphone 107 of the electronic device 105 detects the second audio signal output.

Each of the electronic devices 105, 110 may record timestamps associated with various audio input and output events. In particular, each of the electronic devices 105, 110 may record timestamps for the following events: a playback command issued by the respective processor, an audio output by the respective speaker 109, 114, an audio detected by the respective microphone 107, 112, and an audio input received by the respective processor.

Based on the timestamps, each of the electronic devices 105, 110 may calculate various time periods associated with the audio input and audio output events. In particular, the electronic device 110 can calculate the time between the microphone 112 detecting the first audio signal and the speaker 114 outputting the second audio signal, and the electronic device 105 can calculate the time between the speaker 109 outputting the first audio signal and the microphone 112 detecting the first audio signal. Each of the electronic devices 105, 110 may also calculate an estimated distance "d" 102 between each other based on one or more of the time periods, one or more known latency values, and one or more constants (e.g., the speed of sound).

Each of the electronic devices 105, 110 may transmit, via the communication network 115, any calculated time periods, latency values, estimated distances, and/or other data. Based on data received from the other electronic device, each of the electronic devices 105, 110 may mutually authenticate to the other electronic device. In particular, if the calculated time periods and/or estimated distances are the same or similar (e.g., within a threshold percentage or amount), then the electronic devices 105, 110 may be deemed mutually authenticated. Various techniques for mutual authentication are further described with respect to FIGS. 2-4.

Figure 2:
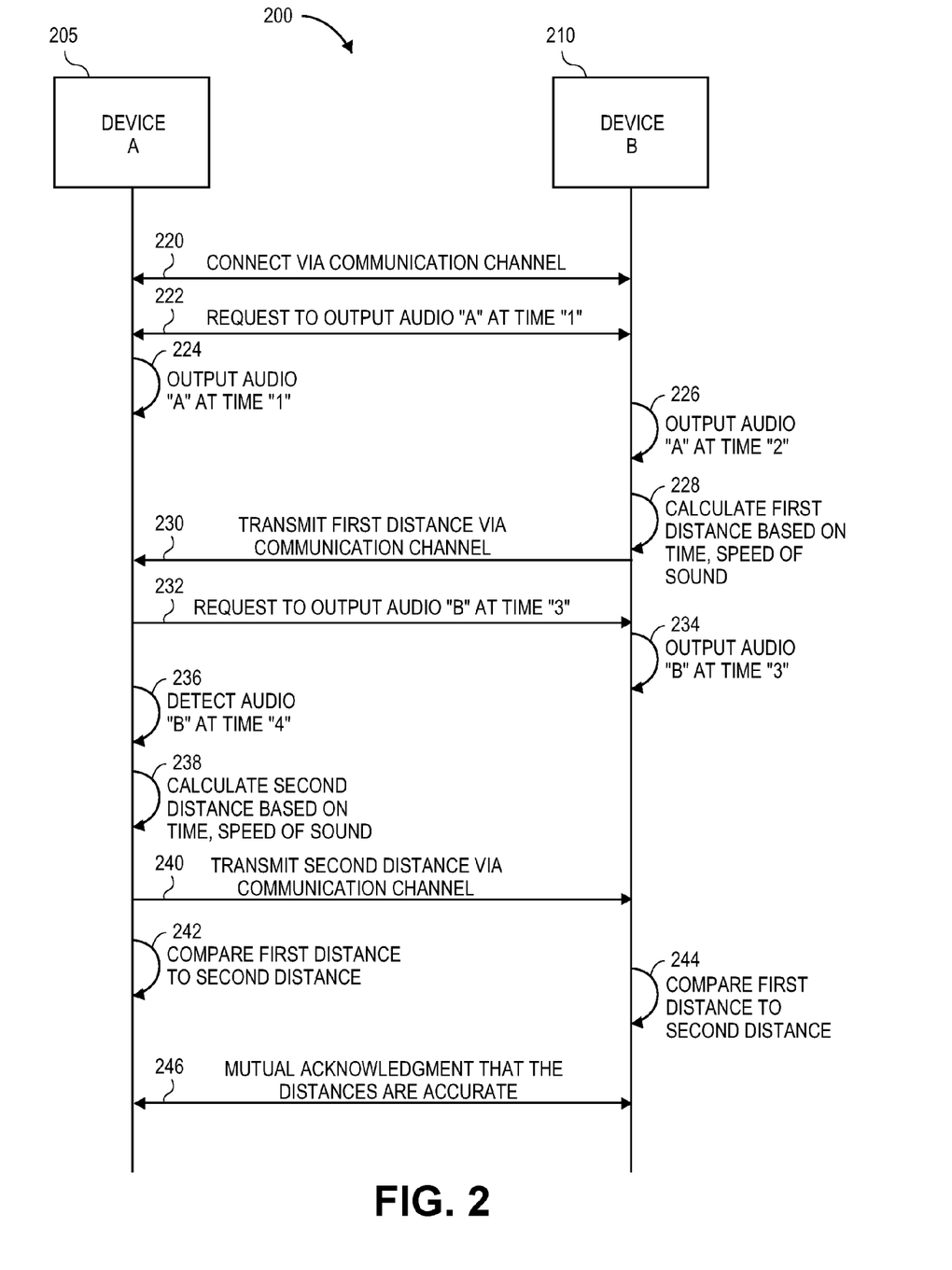
FIG. 2 depicts a signal diagram of a mutual authentication technique in accordance with some embodiments.

FIG. 2 depicts a signal diagram 200 illustrating a mutual authentication technique. The signal diagram 200 includes device A 205 (such as the electronic device 105 as described with respect to FIG. 1) and device B 210 (such as the electronic device 110 as described with respect to FIG. 1). Each of device A 205 and device B 210 may be configured with at least a microphone, a speaker, a processor, a communication module, and a timer. Further, it should be appreciated that each of device A 205 and device B 210 may operate according to a common time, such as a common time retrievable via a cellular signal, a GPS signal, an internal clock, or another source.

The signal diagram 200 may begin when device A 205 connects to device B 210 via a communication channel. In embodiments, each of device A 205 and device B 210 may connect to the same WLAN, or device A 205 and device B 210 may connect to each other via a WPAN connection, short-range communication protocol, or other connection or protocol. Device B 210 can send (222) a request to device A 205 via the communication channel, wherein the request specifies for device A 205 to output an audio signal "A" at time "1". In embodiments, device B 210 may also transmit audio signal "A" to device A 205, or device A 205 may have local or remote access to audio signal "A".

After receiving the request, device A 205 may use the common time to output (224) audio signal "A" at time "1". Further, device B 210 may detect (226) audio signal "A" at time "2". After detecting audio signal "A", device B 210 may calculate (228) a first distance based on time "1", time "2", and a constant value such as the speed of sound. The first distance may represent the distance between device A 205 and device B 210, and device B 210 may calculate the first distance specifically based on multiplying the elapsed time between time "1" and time "2" by the constant value.

After calculating the first distance, device B 210 may transmit the first distance to device A 205 via the communication channel, and device A 205 may store the first distance for subsequent access. Device A 205 may send (232) a request to device B 210 via the communication channel, wherein the request specifies for device B 210 to output an audio signal "B" at time "3". In embodiments, device A 205 may also transmit audio signal "B" to device B 210, or device B 210 may have local or remote access to audio signal "B". After receiving the request, device B 210 may use the common time to output (234) audio signal "B" at time "3". Further, device A 205 may detect (236) audio signal "B" at time "4". After detecting audio signal "B", device A 205 may calculate (238) a second distance based on time "3", time "4", and a constant value such as the speed of sound. The second distance may also represent the distance between device A 205 and device B 210, and device A 205 may calculate the second distance specifically based on multiplying the elapsed time between time "3" and time "4" by the constant value.

Device A 205 may transmit (240) the calculated second distance to device B 210 via the communication channel, and device B 210 may store the second distance for subsequent access. In this regard, both device A 205 and device B 210 have independently calculated a distance between device A 205 and device B 210. Generally, if the first distance and the second distance are the same or within a threshold amount or percentage, then device A 205 and device B 210 may be deemed mutually authenticated.

Accordingly, device A 205 may compare (242) the first distance to the second distance and/or device B 210 may compare (244) the first distance to the second distance. In some embodiments, device A 205 and/or device B 210 may compare individually-calculated differences between the first distance and the second distance to a threshold amount or percentage. For example, if the difference is less than a threshold distance of 0.5 inches, or if the difference is within 5% of either the first distance or the second distance, then the first distance and the second distance may be deemed accurate (and device A 205 and device B 210 may be deemed mutually authenticated). It should be appreciated that only one of device A 205 and device B 210 may perform the distance comparison. It should further be appreciated that, in comparing the distances, device A 205 and/or device B 210 may account for any input latencies, output latencies, and/or local flight time latencies.

After performing the comparisons of (242) and (244), device A 205 and device B 210 may mutually acknowledge (246) that the distances are accurate (or inaccurate). If the distances are accurate, then device A 205 and device B 210 may be deemed mutually authenticated. In some implementations, device A 205 and device B 210 may exchange messages with each other, via the communication channel, indicating whether the first distance and the second distance are within the threshold amount or percentage. It should be appreciated that other techniques and communications for device A 205 and device B 210 to acknowledge authentication are envisioned.

Figure 3:
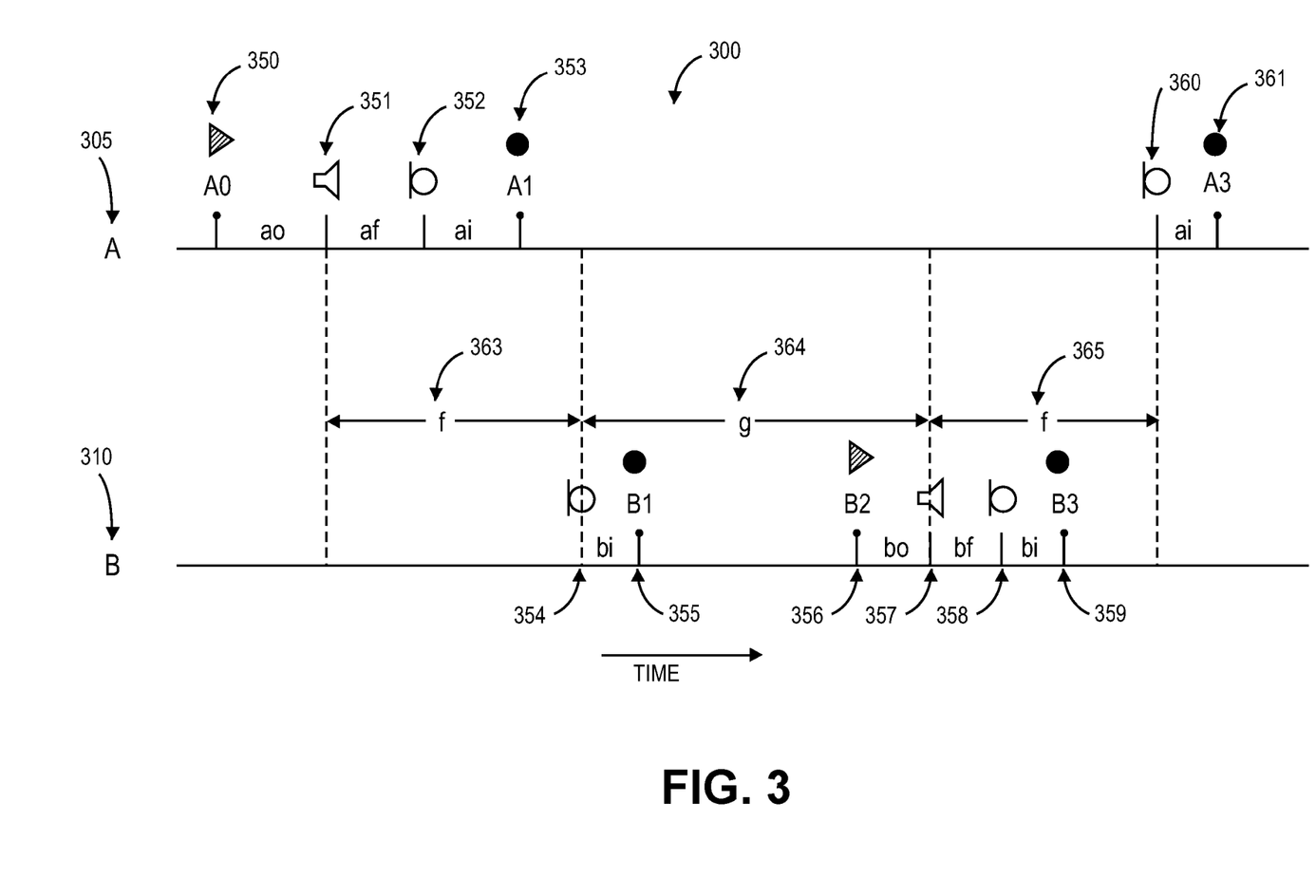
FIG. 3 depicts a timing diagram of a mutual authentication technique in accordance with some embodiments.

FIG. 3 is an example timing diagram 300 associated with another mutual authentication technique. The timing diagram 300 illustrates device A 305 (such as the electronic device 105 as described with respect to FIG. 1) and device B 310 (such as the electronic device 110 as described with respect to FIG. 1). Each of device A 305 and device B 310 may be configured with at least a microphone, a speaker, a processor, a communication module, and a timer.

The line associated with device A 305 indicates commands, inputs, and outputs associated with device A 305, and the line associated with device B 310 indicates commands, inputs, and outputs associated with device B 310. Further, the horizontal dimension of the timing diagram 300 represents a time progression. It should be appreciated that device A 305 and device B 310 are connected to each other via a communication channel, such as a WLAN, WPAN, or other network, as discussed herein. The respective timers of device A 305 and device B 310 may be configured to record individual timestamps associated with each of the events depicted on the lines associated with device A 305 and device B 310, which the respective processors of device A 305 and device B 310 may use to perform various calculations.

At 350 (A0), a processor of device A 305 may issue an audio playback command to a speaker of device A 305 to output a first audio signal. In embodiments, device A 305 may automatically issue the audio playback command, or a user or other device (e.g., device B 310) may interface with device A 305 to request the audio playback command. For example, device B 310 may transmit the audio playback command to device A 305 via the communication channel. At 351, the speaker of device A 305 may output the first audio signal. Accordingly, the time period "ao" represents the output latency of device A 305, or the amount of time between the processor issuing the audio playback command and the speaker outputting the first audio signal.

At 352, a microphone of device A 305 may detect the first audio signal that is output by the speaker of device A 305

(i.e., device A 305 detects its own output audio signal). Accordingly, the time period "af" represents the local flight time of the first audio signal for device A 305, where the local flight time is a constant value based on a distance between the speaker and the microphone, as well as another constant value such as the speed of sound. At 353 (A1), the processor of device A 305 may receive or detect, from its microphone, the first audio signal that is detected by the microphone. Accordingly, the time period "ai" represents the input latency of device A 305, or the amount of time between the microphone detecting the first audio signal and the processor receiving the first audio signal from the microphone.

At 354, a microphone of device B 310 may detect the first audio signal that is output by the speaker of device A 305. Accordingly, the time period "f" (363) represents an audio flight time of the first audio signal between when the speaker of device A 305 outputs the first audio signal and the microphone of device B 310 detects the first audio signal. At 355 (B1), a processor of device B 310 may receive or detect, from the microphone of device B 310, the first audio signal that is detected by the microphone. Accordingly, the time period "bi" represents the input latency of device B 310, or the amount of time between the microphone detecting the first audio signal and the processor receiving the first audio signal from the microphone.

At 356 (B2), a processor of device B 310 may issue an audio playback command to a speaker of device B 310 to output a second audio signal. In embodiments, device B 310 may automatically issue the audio playback command, or a user or other device (e.g., device A 305) may interface with device B 310 to request the audio playback command. For example, device A 305 may transmit the audio playback command to device B 310 via the communication channel. At 357, the speaker of device B 310 may output the second audio signal. Accordingly, the time period "bo" represents the output latency of device B 310, or the amount of time between the processor issuing the audio playback command and the speaker outputting the second audio signal.

At 358, a microphone of device B 310 may detect the second audio signal that is output by the speaker of device B 310 (i.e., device B 310 detects its own output audio signal). Accordingly, the time period "bf" represents the local flight time of the second audio signal for device B 310, where the local flight time is a constant value based on a distance between the speaker and the microphone, as well as another constant value such as the speed of sound. At 359 (B3), the processor of device B 310 may receive or detect, from its microphone, the second audio signal that is detected by the microphone. Accordingly, the time period "bi" represents the input latency of device B 310, or the amount of time between the microphone detecting the second audio signal and the processor receiving the second audio signal from the microphone.

At 360, a microphone of device A 305 may detect the second audio signal that is output by the speaker of device B 310. Accordingly, the time period "f" (365) represents an audio flight time of the second audio signal between when the speaker of device B 310 outputs the second audio signal and the microphone of device A 305 detects the second audio signal. In embodiments, the time period "f" (365) may be the same as or different from the time period "f" (363). At 361 (A3), a processor of device A 305 may receive or detect, from the microphone of device A 305, the second audio signal that is detected by the microphone.

The time period "g" (364) represents the "turnaround time" between the microphone of device B 310 detecting the first audio signal and the speaker of device B 310 outputting the second audio signal. The processor of device B 310 may calculate the time period "g" (364) using the following equation (1):

$$g=(B3-B1)-bf \qquad (1)$$

Further, device B 310 may transmit the turnaround time (time period "g" (364)), or a portion thereof, to device A 305 via the communication channel. In some embodiments, device A 305 may already store bf, and thus device B 310 may transmit the difference (B3−B1) to device A 305 via the communication channel.

The processor of device A 305 may calculate the combination of the time period "f" (363), the time period "g" (364), and the time period "f" (365) using the following equation (2):

$$2f+g=(A3-A1)+af \qquad (2)$$

The combination of equation (1) and equation (2) results in equation (3):

$$2f=(A3-A1)-(B3-B1)+af+bf \qquad (3)$$

2f may correspond to a "round-trip audio flight time" that represents an amount of time between when the speaker of device A 305 outputs the first audio signal and the microphone of device B 310 detects the first audio signal, and between when the speaker of device B 310 outputs the second audio signal and the microphone of device A 305 detects the second audio signal. In some implementations, half the value of "2f" is "f," and may be equal to one or both of the time period "f" (363) and the time period "f" (365). Thus, by device B 310 communicating the turnaround time to device A 305 via the communication channel, device A 305 may calculate "2f" and facilitate mutual authentication of device A 305 and device B 310. In embodiments, device A 305 and device B 310 may exchange acknowledgements as well as any calculations with each other.

Figure 4:
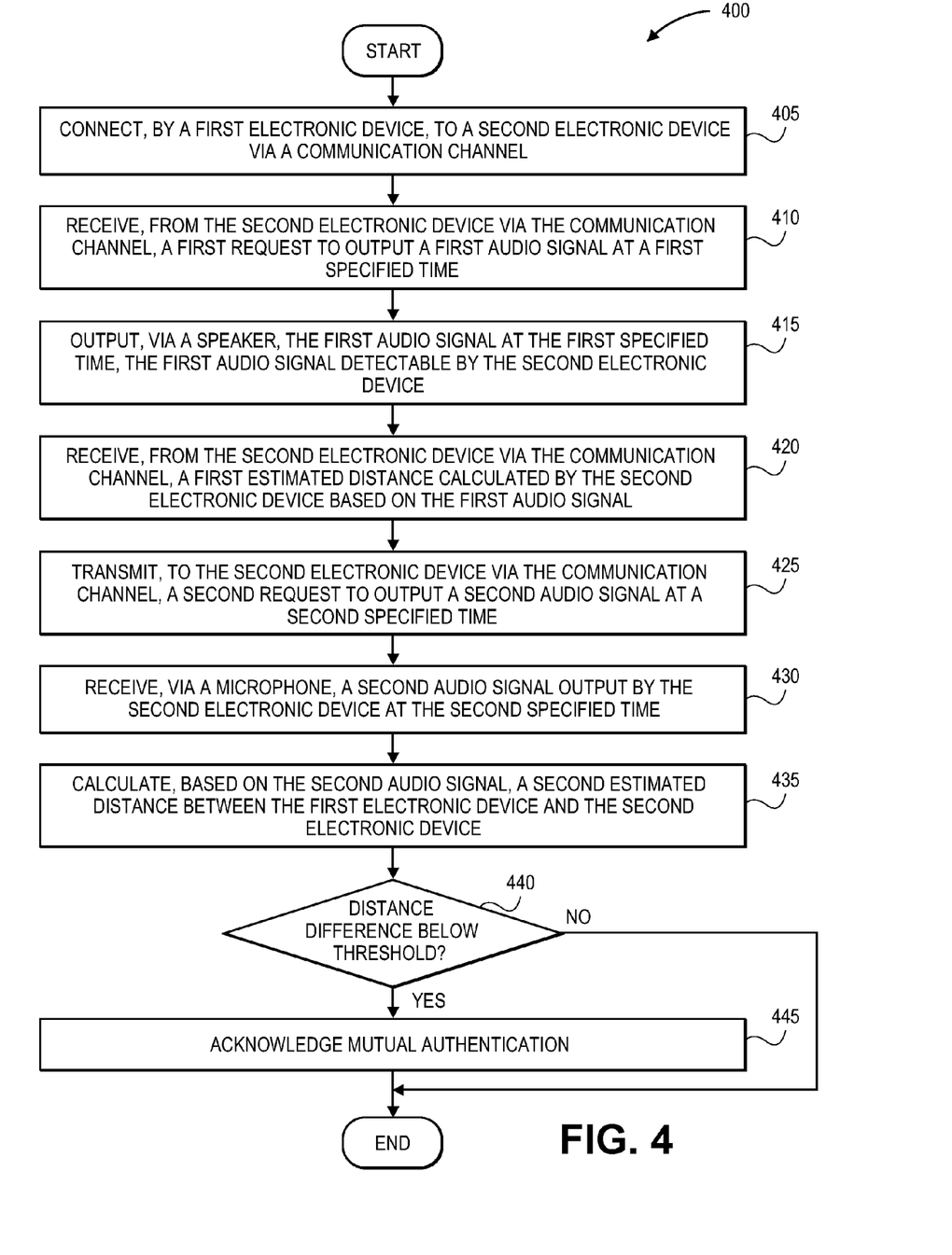
FIG. 4 depicts a flow diagram of a mutual authentication technique in accordance with some embodiments.

FIG. 4 is a flowchart of a method 400 for a first electronic device (such as either of the electronic devices 105, 110 as described with respect to FIG. 1) to output and detect various audio signals, communicate with a second electronic device, and perform various calculations to mutually authenticate to the second electronic device. The order of the steps of the depicted flowchart of FIG. 4 can differ from the version shown, and certain steps can be eliminated, and/or certain other ones can be added, depending upon the implementation.

The method 400 begins with the first electronic device connecting 405 to the second electronic device via a communication channel. Either or both of the first electronic device or the second electronic device may initiate the connection, and the communication channel may be a WLAN, WPAN, or other type of connection. The first electronic device may receive 410, from the second electronic device via the communication channel, a first request (or command) to output a first audio signal at a first specified time. The first electronic device may also receive the first audio signal from the second electronic device, or may access or retrieve the first audio signal from another source. In embodiments, both the first electronic device and the second electronic device may maintain a common clock or timer or have access to a common clock or timer.

At the first specified time, the electronic device may output 415, via a speaker, the first audio signal that is detectable by the second electronic device. After detecting the first audio signal, the second electronic device may calculate a first estimated distance based on a first receipt time of the first audio signal, a time difference between the first specified time and the first receipt time, a constant value such as the speed of sound, and optionally one or more fixed latencies (such as an output latency and an input latency of the second electronic device and/or the first electronic device).

After calculating the first estimated distance, the second electronic device may transmit the first estimated distance to the first electronic device via the communication channel. Thus, at 420, the first electronic device may receive the first estimated distance from the second electronic device via the communication channel. The first electronic device may generate a second request (or command) to output a second audio signal at a second specified time, and transmit 425 the second request to the second electronic device. The first electronic device may also transmit the second audio signal to the second electronic device, or the second electronic device may access or retrieve the second audio signal from another source.

In either case, the second electronic device may output the second audio signal at the second specified time and the first electronic device may receive (430), via a microphone, the second audio signal. The first electronic device may record a receipt time corresponding to when the first electronic device receives the second audio signal. Further, the first electronic device may calculate (435), based on the second audio signal, a second estimated distance between the first electronic device and the second electronic device. In particular, the first electronic device can calculate a time difference between the second specified time and the recorded receipt time, and the first electronic device can calculate the second estimated distance based on the time difference, a constant value such as the speed of sound, and optionally one or more fixed latencies (such as an output latency and an input latency of the first electronic device and/or the second electronic device).

The first electronic device may compare the first estimated distance to the second estimated distance to determine 440 whether the difference between distances is below a threshold percentage or amount. For example, the threshold percentage may be 5% or other values, or the threshold amount may be 1.0 inches or other values. If the difference between distances is not below the threshold ("NO"), processing may end or proceed to other functionality. If the difference between distances is below the threshold ("YES"), the first electronic device may be deemed mutually authenticated with the second electronic device, and the first electronic device and the second electronic device may acknowledge 445 mutual authentication. In particular, the first electronic device and the second electronic device may exchange acknowledgements. In some embodiments, the first electronic device may transmit the second estimated distance to the second electronic device via the communication channel so that the second electronic device may independently determine whether the distance difference is below the threshold.

Figure 5:
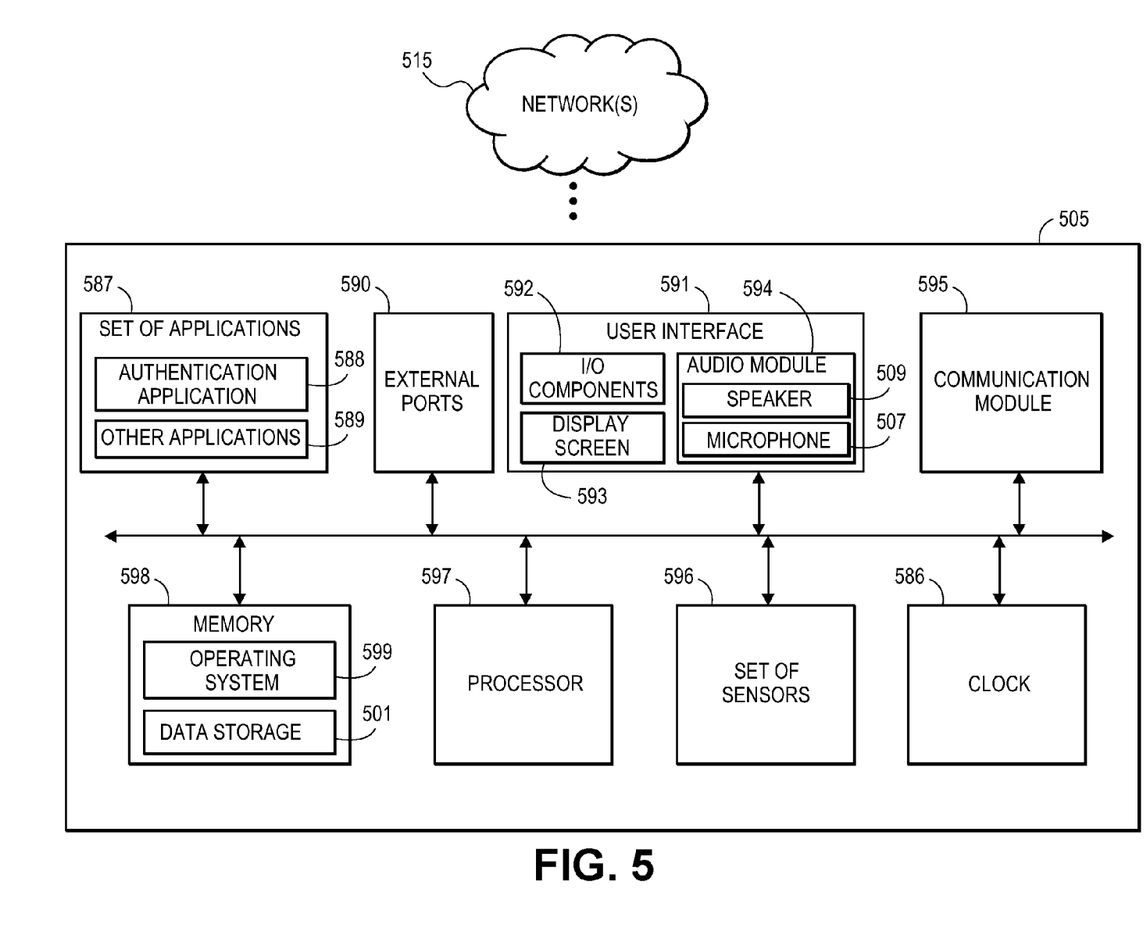
FIG. 5 is a block diagram of an electronic device in accordance with some embodiments.

FIG. 5 illustrates an example electronic device 505 (such as either of the electronic devices 105, 110 discussed with respect to FIG. 1, or other devices) in which the functionalities as discussed may be implemented. The electronic device 505 can include a processor 597 or other similar type of controller module or microcontroller, as well as a memory 598. The processor 597 may include a singular processor or may include more than one separate processor such as: an application processor to manage a set of applications 587 and a user interface 591 of the electronic device 505, a sensor processor to manage sensor 596 data, and an audio processor to process audio 594 data.

The memory 598 can store an operating system 599 capable of facilitating the functionalities discussed. The processor 597 can interface with the memory 598 to execute the operating system 599 and a set of applications 587. The set of applications 587 (which the memory 598 can also store) can include an authentication application 588 configured for various calculations and processing associated the mutual authentication techniques as discussed herein. The set of applications 587 can also include one or more other applications 589 such as, for example, music and entertainment applications, phone applications, messaging applications, calendar applications, social networking applications, utilities, productivity applications, games, travel applications, communication application, shopping applications, finance applications, sports applications, photography applications, mapping applications, weather applications, applications for connecting to an online marketplace, and/or other applications.

The processor 597 and the set of applications 587 may interface with a clock 586 to perform calculations associated with mutual authentication. In particular, the clock 586 may maintain a timer from which the processor 597 may retrieve corresponding timestamps from which the authentication application 588 may make necessary recordations and calculations.

The memory 598 can further include a data storage 501 configured to store various parameters and data associated with the mutual authentication functionalities. According to embodiments, the authentication application 588 can interface with the data storage 501 to retrieve appropriate parameters and data for various calculations. Generally, the memory 598 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 505 can further include a communication module 595 configured to interface with one or more external ports 590 to communicate data via one or more wired or wireless networks 515. For example, the communication module 595 can leverage the external ports 590 to establish a local area network or a personal area network for connecting the electronic device 505 to another electronic device. According to some embodiments, the communication module 595 can include one or more transceivers functioning in accordance with IEEE standards, 3GPP standards, or other standards, and configured to receive and transmit data via the one or more external ports 590. More particularly, the communication module 595 can include one or more WWAN, WLAN, and/or WPAN transceivers configured to connect the electronic device 505 to wide area networks, local area networks, and/or personal area networks.

The electronic device 505 can further include one or more sensors 596 such as, for example, one or more accelerometers, gyroscopes, imaging sensors, proximity sensors, location modules, light sensors, infrared sensors, touch sensors, NFC components, and/or other sensors. The electronic device 505 may further include a user interface 591 configured to present information to the user and/or receive inputs from the user. As illustrated in FIG. 5, the user interface 591 includes a display screen 593 and I/O components 592 (e.g., capacitive or resistive touch sensitive input panels, keys, buttons, lights, LEDs, cursor control devices, haptic devices, and others). In embodiments, the display screen 593 is a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 591 may further include an audio module 594 including hardware components such as one or more speakers 509 for outputting audio data and one or more microphones 507 for detecting or receiving audio.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 597 (e.g., working in connection with the operating system 599) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Thus, it should be clear from the preceding disclosure that the systems and methods offer improved mutual authentication techniques. In particular, the embodiments various communication channels for electronic devices to exchange data that the electronic devices use to authenticate each other. Accordingly, the embodiments advantageously enable secure data transmissions and other functionalities.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A method in a first electronic device of mutual authentication between the first electronic device and a second electronic device, the method comprising:
   connecting to the second electronic device via a communication channel;
   receiving, from the second electronic device via the communication channel, a request to output a first audio signal at a specified time;
   outputting, via a speaker of the first electronic device at the specified time, the first audio signal detectable by the second electronic device;
   receiving, from the second electronic device via the communication channel, a first estimated distance between the first electronic device and the second electronic device, the first estimated distance calculated by the second electronic device based at least in part on the specified time;
   receiving, via a microphone of the first electronic device, a second audio signal output by the second electronic device;
   recording a receipt time corresponding to when the second audio signal is received;
   calculating, based at least in part on the receipt time, a second estimated distance between the first electronic device and the second electronic device; and
   comparing the first estimated distance to the second estimated distance.

2. The method of claim 1, wherein comparing the first estimated distance to the second estimated distance comprises:
   determining that a difference between the first estimated distance and the second estimated distance is below a threshold amount.

3. The method of claim 2, further comprising:
   transmitting, to the second electronic device via the communication channel, (i) the second estimated distance and (ii) a first acknowledgement that the difference between the first estimated distance and the second estimated distance is below the threshold amount.

4. The method of claim 3, further comprising:
   receiving, from the second electronic device via the communication channel, a second acknowledgement that the second electronic device determined that the difference between the first estimated distance and the second estimated distance is below the threshold amount.

5. The method of claim 1, wherein connecting to the second electronic device via the communication channel comprises:
   connecting to the second electronic device via one of a wireless local area network (WLAN) or a wireless personal area network (WPAN).

6. The method of claim 1, further comprising:
   receiving the first audio signal from the second electronic device via the communication channel.

7. The method of claim 1, wherein outputting the first audio signal comprises:
   outputting the first audio signal at the specified time according to a common time used by the first electronic device and the second electronic device.

8. The method of claim 1, wherein calculating the second estimated distance comprises:
   calculating the second estimated distance based at least in part on the receipt time and a pre-calculated speed of sound value.

9. The method of claim 1, further comprising:
   transmitting, to the second electronic device via the communication channel, an additional request to output the second audio signal at an additional specified time.

10. The method of claim 1, further comprising:
    transmitting the second audio signal to the second electronic device via the communication channel.

11. An electronic device configured to mutually authenticate to an additional electronic device, comprising:
    a communication module configured to connect the electronic device to the additional electronic device via a communication channel;
    a speaker configured to output audio;
    a microphone configured to detect audio; and
    a processor interfacing with the communication module, the speaker, and the microphone, and configured to:

receive, from the additional electronic device via the communication channel, a request to output a first audio signal at a specified time, cause the speaker to output the first audio signal at the specified time, the first audio signal detectable by the additional electronic device, receive, from the additional electronic device via the communication channel, a first estimated distance between the electronic device and the additional electronic device, the first estimated distance calculated by the additional electronic device based at least in part on the specified time, receive, via the microphone, a second audio signal output by the additional electronic device, record a receipt time corresponding to when the second audio signal is received, calculate, based at least in part on the receipt time, a second estimated distance between the electronic device and the additional electronic device, and compare the first estimated distance to the second estimated distance.

12. The electronic device of claim 11, wherein to compare the first estimated distance to the second estimated distance, the processor is configured to:

determine that a difference between the first estimated distance and the second estimated distance is below a threshold amount.

13. The electronic device of claim 12, wherein the processor is further configured to:

transmit, to the additional electronic device via the communication channel, (i) the second estimated distance and (ii) a first acknowledgement that the difference between the first estimated distance and the second estimated distance is below the threshold amount.

14. The electronic device of claim 13, wherein the processor is further configured to:

receive, from the additional electronic device via the communication channel, a second acknowledgement that the additional electronic device determined that the difference between the first estimated distance and the second estimated distance is below the threshold amount.

15. The electronic device of claim 11, wherein the communication module connects the electronic device to the additional electronic device via one of a wireless local area network (WLAN) or a wireless personal area network (WPAN).

16. The electronic device of claim 11, wherein the processor is further configured to:

receive the first audio signal from the additional electronic device via the communication channel.

17. The electronic device of claim 11, wherein to cause the speaker to output the first audio signal, the processor is configured to:

cause the speaker to output the first audio signal at the specified time according to a common time used by the electronic device and the additional electronic device.

18. The electronic device of claim 11, wherein to calculate the second estimated distance, the processor is configured to:

calculate the second estimated distance based at least in part on the receipt time and a pre-calculated speed of sound value.

19. The electronic device of claim 11, wherein the processor is further configured to:

transmit, to the additional electronic device via the communication channel, an additional request to output the second audio signal at an additional specified time.

20. The electronic device of claim 11, wherein the processor is further configured to:

transmit the second audio signal to the second electronic device via the communication channel.

* * * * *

UNITED STATES PATENT AND TRADEMARK OFFICE
CERTIFICATE OF CORRECTION

PATENT NO. : 9,935,949 B2  
APPLICATION NO. : 15/628253  
DATED : April 3, 2018  
INVENTOR(S) : Michael Daley et al.

Page 1 of 1

It is certified that error appears in the above-identified patent and that said Letters Patent is hereby corrected as shown below:

On the Title Page

At item (60), "(60)" should be -- (63) --.

Signed and Sealed this
Sixth Day of November, 2018

Andrei Iancu
*Director of the United States Patent and Trademark Office*